(12) United States Patent
Katsoulis et al.

(10) Patent No.: US 6,368,535 B1
(45) Date of Patent: Apr. 9, 2002

(54) CONDENSATION REACTION CURABLE SILSESQUIOXANE RESIN COMPOSITION AND METHODS FOR THE SYNTHESIS AND CURE THEREOF

(75) Inventors: Dimitris Elias Katsoulis; Bizhong Zhu, both of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/369,413

(22) Filed: Aug. 6, 1999

(51) Int. Cl.[7] .................. B29C 71/00; C05F 283/12; C08G 77/06; C08G 77/38; C08G 77/60
(52) U.S. Cl. .................. 264/236; 264/331.11; 427/387; 525/477; 528/17; 528/18; 528/22; 528/35
(58) Field of Search .................. 528/35, 17, 18, 528/22; 525/477; 427/387; 264/236, 331.11

(56) References Cited

U.S. PATENT DOCUMENTS

| | | | | |
|---|---|---|---|---|
| 2,562,000 A | * | 7/1951 | Sveda | 528/35 |
| 3,202,634 A | * | 8/1965 | Merker | 528/43 |
| 3,419,593 A | | 12/1968 | Willing | 556/479 |
| 3,445,420 A | | 5/1969 | Kookootsedes et al. | 524/862 |
| 4,513,132 A | * | 4/1985 | Shoji et al. | 528/35 |
| 4,694,040 A | * | 9/1987 | Hishimoto et al. | 528/35 |
| 4,965,333 A | | 10/1990 | Inouye et al. | 528/33 |
| 5,747,608 A | | 5/1998 | Katsoulis et al. | 525/477 |
| 5,830,950 A | | 11/1998 | Katsoulis et al. | 525/477 |
| 6,046,283 A | | 4/2000 | Katsoulis et al. | 525/477 |

FOREIGN PATENT DOCUMENTS

| | | |
|---|---|---|
| CA | 691206 | 7/1964 |
| GB | 0-304-958 | 3/1989 |

OTHER PUBLICATIONS

Database HCA—Online!, Chemical Abstracts Service, Columbus, Ohio, US. "Alkylene–bridged Polysilsesquioxane Aerogels: Highly Porous Hybrid Organic–Inorganic Materials". Journal of Non–Crystalline Solids. No. 186, 1995, pp. 44–53, AN–123:63536 HCA, month unknown.

* cited by examiner

*Primary Examiner*—Daniel S. Metzmaier
(74) *Attorney, Agent, or Firm*—Timothy J. Troy

(57) ABSTRACT

A condensation reaction curable silsesquioxane resin composition and methods for its preparation and cure are disclosed. By modifying the silsesquioxane resin with a silyl-terminated hydrocarbon, such as a silphenylene, the resulting silsesquioxane resin has improved strength and toughness without significant loss of modulus.

19 Claims, 1 Drawing Sheet

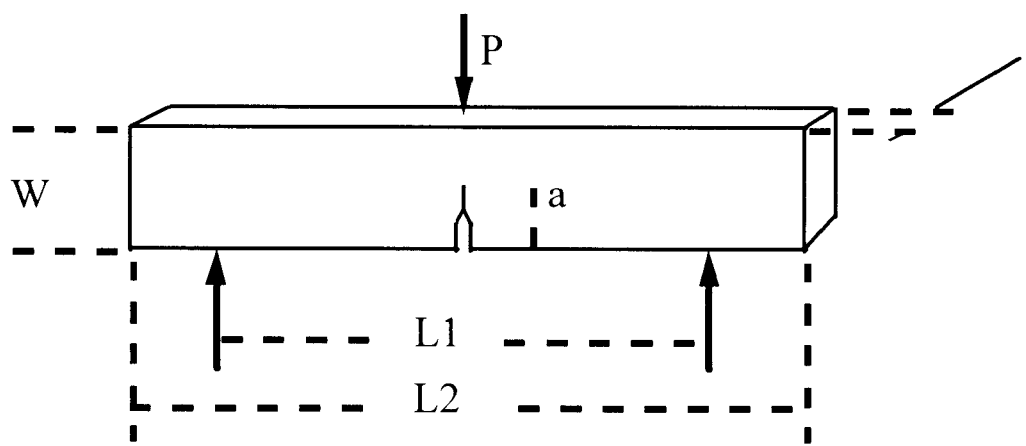

CONDENSATION REACTION CURABLE SILSESQUIOXANE RESIN COMPOSITION AND METHODS FOR THE SYNTHESIS AND CURE THEREOF

FIELD OF THE INVENTION

This invention relates to a curable silsesquioxane resin composition that, when cured, produces a cured silsesquioxane resin having high strength and fracture toughness without loss of modulus. This invention further relates to a method for synthesizing the composition and the cured silsesquioxane resin.

BACKGROUND OF THE INVENTION

Conventional thermoset networks of high cross link density, such as silsesquioxane resins, typically suffer from the drawback that when measures are taken to improve a mechanical property such as strength, fracture toughness, or modulus, one or more of the other properties suffers a detriment.

Canadian Patent No. 691,206 (1964) discloses the use of silica-filled silicone resin/fluid combinations for damping vibrations. The ability of the disclosed silicone resin/fluid compositions to dampen vibrations is illustrated through the measurement of the ratio of G', the elastic shear modulus, to G", the loss shear modulus. The magnitude of this ratio is indicated as being inversely proportional to the ability of the material to absorb vibration. The ratio of G'/G" of the subject materials is compared to that of compositions prepared without a resin constituent.

The above-described toughened silicone compositions are generally of the types having a fairly low modulus of elasticity. As used herein to describe silicone resins, the term "rigid" means that the resin material, in its unfilled condition, exhibits a certain "stiffness" characterized by having a Young's modulus of at least 0.67 GPa. As used herein, the term "unfilled" means that no reinforcing fillers, such as carbon or glass fibers or silica powders have been added to the resin.

Another method for increasing toughness of a silicone resin is by modifying the silicone resin with a rubber compound. U.S. Pat. No. 5,747,608 describes a rubber-modified resin and U.S. Pat. No. 5,830,950 describes a method of making the rubber-modified resin. The rubber modified-resin is prepared by reacting an uncured organosilicone resin and a silicone rubber to form a rubber-modified resin. The resin and rubber can be reacted by addition reaction, condensation reaction, or free radical reaction. The resulting rubber-modified resin has a Young's modulus of at least $6.9 \times 10^8$ Pa in its unfilled condition. However, strength and toughness of the rubber-modified resin is generally inferior to tough organic polymers and still insufficient for some applications.

Rigid silsesquioxane resins have been employed in applications that take advantage of their heat- and fire-resistant properties. These properties make the silsesquioxane resins attractive for use in fiber-reinforced composites for electrical laminates, structural use in automotive components, aircraft and naval vessels. Thus, there exists a need for rigid silsesquioxane resins having increased flexural strength, flexural strain, fracture toughness $K_{Ic}$, and fracture energy $G_{Ic}$, without significant loss of modulus or degradation of thermal stability. In addition, rigid silsesquioxane resins have low dielectric constants and are useful as interlayer dielectric materials. Rigid silsesquioxane resins are also useful as abrasion resistant coatings.

Therefore, it is an object of this invention to provide a curable composition that can be used to prepare a cured silsesquioxane resin having high strength and fracture toughness without loss of modulus. It is a further object of this invention to provide a method for preparing the cured silsesquioxane resin.

SUMMARY OF THE INVENTION

This invention relates to a curable silsesquioxane resin composition used to prepare a cured silsesquioxane resin. The cured silsesquioxane resin has improved strength and toughness over known resins. The improvements in strength and toughness were made without significant loss of stiffness. The cured silsesquioxane resin is synthesized by a method of copolymerization of a combination comprising a silsesquioxane precursor and a silyl-terminated hydrocarbon. Copolymerization is carried out by condensation reaction. When the silyl-terminated hydrocarbon is used instead of, or in addition to, a traditional silane or siloxane crosslinker, the resulting cured silsesquioxane resin has unexpectedly high mechanical properties.

BRIEF DESCRIPTION OF THE DRAWING

The FIGURE represents a sample of the cured silsesquioxane resin used in fracture toughness testing.

DETAILED DESCRIPTION OF THE INVENTION

This invention relates to a curable silsesquioxane resin composition that is used to prepare a cured silsesquioxane resin. The curable silsesquioxane resin composition comprises a copolymerized reaction product of components (A) and (B), where component (A) is a silsesquioxane precursor and component (B) is a silyl-terminated hydrocarbon. Component (A) may further comprise (C) a crosslinker. The combination may further comprise (D) a condensation reaction catalyst and (G) a solvent. The curable silsesquioxane resin composition may further comprise one or more optional components selected from the group consisting of (D) the condensation catalyst, (E) a first silicone rubber, (F) a second silicone rubber, and (G) the solvent.

Component (A) is a silsesquioxane precursor. The amount of component (A) in the curable composition is generally 5 to 95 weight %, preferably 50 to 95 weight %.

Component (A) is selected from the group consisting of:
(I) an uncured organosilicone resin,
(II) hydrolyzable precursors of (I); and
(III) a hydrolyzate formed from (II).

Ingredient (A)(I) is an uncured organosilicone resin comprising units of the formula $R^1_a R^2_b R^3_c SiO_{(4-a-b-c)/2}$, wherein a is 0 or a positive number, b is zero or a positive number, c is 0 or a positive number, with the provisos that $1.0 \leq (a+b+c) \leq 3.0$ and the uncured organosilicone resin has at least 2 groups $R^1$ per molecule, and each $R^1$ is a functional group independently selected from the group consisting of a halogen atom, a hydroxyl group, and a hydrolyzable group such as an alkoxy, oximo, alkyloximo, aryloximo, alkylcarboxyl, or arylcarboxyl group. Preferably, the uncured organosilicone resin has 2 to 8 groups $R^1$ per molecule. Each $R^2$ and each $R^3$ are independently selected from the group consisting of nonfunctional groups and $R^1$. 'Nonfunctional' means that the groups do not participate in the curing reaction to produce the cured silsesquioxane resin of this invention.

The nonfunctional groups for $R^2$ and $R^3$ are independently selected from the group consisting of alkyl and aryl groups. Suitable alkyl groups include such as methyl, ethyl, isopropyl, n-butyl, and isobutyl. Preferably, the nonfunctional groups are selected from the group consisting of methyl groups, phenyl groups, and combinations thereof.

Ingredient (A)(I) the uncured organosilicone resin can be made in a known manner by hydrolysis and condensation of ingredient (A)(II) the hydrolyzable precursors of (A)(I), which include the aforementioned $R^1$ and $R^2$ groups as a part of their structure. Such hydrolyzable precursors include trifunctional silanes, such as organotrialkoxysilanes and organotrihalosilanes, which produce the desired three dimensional resin structure, and monofunctional silanes, such as triorganomonoalkoxysilanes, triorganomonohalosilanes, disiloxanes and disilazanes, which act as endcappers. Organotrialkoxysilanes and organotrihalosilanes are also suitable for use in ingredient (A)(II). Suitable organotrihalosilanes include methyltrichlorosilane and phenyltrichlorosilane, ethyl trichlorosilane, n-butyl trichlorosilane, t-butyl trichlorosilane, n-propyl trichlorosilane, and isopropyl trichlorosilane. The organo groups in the organotrialkoxysilanes and organotrihalosilanes can be nonfunctional, including alkyl groups such as methyl, ethyl, propyl, and butyl; and halogenated alkyl groups such as trifluoropropyl. The organo groups in the organotrialkoxysilanes and organotrihalosilanes can also be functional groups, including alkenyl groups such as vinyl, allyl, and hexenyl. Those skilled in the art will also appreciate that difunctional silanes, such as diorganodihalosilanes and diorganodialkoxysilanes, and small amounts of tetrafunctional silanes, such as tetrahalosilanes and tetraalkoxysilanes, may be included in ingredient (A)(II).

Ingredient (A)(II) may further comprise component (C), an optional crosslinker. Suitable crosslinkers have chemical formulae that include at least one silicon atom. Suitable crosslinkers are exemplified by tetraethoxysilane, methyltrimethoxysilane and methyltriacetoxy-, methyltrioximo- and tetraoximosilane. Those skilled in the art will appreciate that crosslinker may include relatively short siloxy chains between reactive functional groups. As used herein, then, the term "Crosslinker" is limited to silanes and to such siloxanes wherein the degree of polymerization of the siloxy chain is less than six. The amount of component (C) in the composition is typically 0 to 30 weight %, preferably 0 to 10 weight % on the weight of the combination comprising (A) and (B).

Those skilled in the art will appreciate that the use of acid hydrolysis and condensation to form organosilicone resins generally results in a composition that includes a considerable concentration of nonsterically-hindered residual hydroxyl groups. Thus, condensation reactions using the residual hydroxy functionality of the resin is a convenient way to form the cured silsesquioxane resin of the invention through a condensation cure system.

Ingredient (A)(III) is a hydrolyzate of ingredient (A)(II) the hydrolysis precursor. The hydrolyzate is an organofunctional silanol containing compound of low molecular weight, which is very reactive towards condensation. This compound might also contain in its composition, completely uncondensed silanol bearing compounds such as organotrisilanols. Suitable organotrisilanols are exemplified by methyltrisilanol, phenyl trisilanol, diphenyl siladiol, and phenylmethyl siladiol.

Component (B) is a silyl-terminated hydrocarbon. The amount of component (B) in the curable composition is typically 0.5 to 50 weight %, preferably 5 to 20 weight %. Component (B) has the general formula

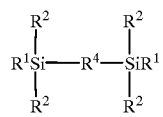

where $R^1$ and $R^2$ are as described above for component (A). $R^4$ is a divalent hydrocarbon group. $R^4$ can have both arylene and alkylene segments.

Component (B) can be prepared by a Grignard reaction process. For example, one method for making a silyl-terminated hydrocarbon for use in this invention comprises heating to a temperature of room temperature to 200° C., preferably 50 to 65° C., a combination of magnesium and a solvent such as diethylether or tetrahydrofuran. A di-halogenated hydrocarbon, such as dibromobenzene is then added to the magnesium and solvent over a period of several hours.

After complete addition of the di-halogenated hydrocarbon, a halogenated silane, such as dimethyldihydrogenchlorosilane, is then added, and an optional organic solvent can also be added. The resulting mixture is then heated for a period of several hours at a temperature of 50 to 65° C. Any excess halogenated silane is then removed by any convenient means, such as neutralization with a saturated aqueous solution of $NH_4Cl$. The resulting product can then be dried with a drying agent such as magnesium sulfate and then purified by distillation.

Hydrolysis of the resulting product can then be carried out in dioxane with palladium on activated carbon as the catalyst. A buffer solution such as an aqueous solution of $NaH_2PO_4 \cdot H_2O$ and $Na_2HPO_4$ can then be added. The resulting product can then be recovered by any convenient means, such as filtering and drying or by crystallization.

Compounds suitable for component (B) are exemplified by:

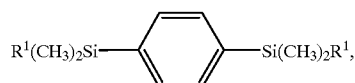

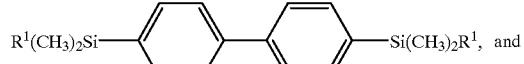

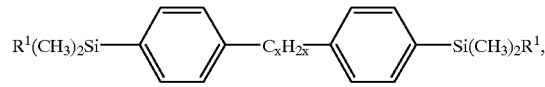

where $R^1$ is as defined above for component (A), and x is 1 to 6, preferably 1 to 4.

Compounds suitable for use as component (B) are further exemplified by those shown below. These compounds are known in the art and are commercially available. For example, p-bis(hydroxydimethylsilyl)benzene, shown below, can be obtained from Gelest, Inc. of Tullytown, Pa. and p-bis(chlorodimethylsilyl-ethyl)benzene can be obtained from United Chemical Technologies, Inc.

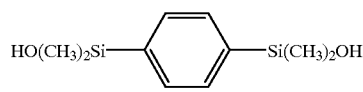

p-bis(hydroxydimethylsilyl)benzene

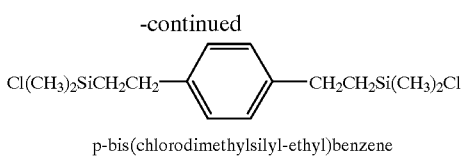

p-bis(chlorodimethylsilyl-ethyl)benzene

Component (D), an optional condensation catalyst, can be added to the curable silsesquioxane resin composition. The amount of component (D) in the composition is typically 0 to 2, preferably 0.05 to 0.4 weight %. Component (D) is selected from the group consisting of (D') weak condensation reaction catalysts and (D") strong condensation reaction catalysts. Weak condensation reaction catalysts include metal esters and alkoxides of Group IVB metals, such as zirconium, hafnium, and titanium. Weak condensation reaction catalysts are exemplified by titanium tetrabutoxide. Strong condensation reaction catalysts include zinc octoate and choline octoate catalysts. Other suitable catalysts are strong acids and bases, such as sulfuric acid, phosphoric acid, potassium hydroxide, cesium hydroxide, metal silanolates and calcined lime.

Other condensation catalysts for component (D) include metal esters or alkoxides of tin and zinc. Dibutyl tin dilaurate is an example. Tin catalysts, however, tend to decrease the thermal stability of the cured silsesquioxane resins of the invention and should be avoided for high temperature applications. Also useful are amine and metal carboxylates and quaternary bases. Those skilled in the art will recognize that certain quaternary bases, such as tetramethyl ammonium hydroxide, have the advantage that they decompose to volatile by-products when heated to curing temperatures, and are thus readily removed from the cured silsesquioxane resin formed by curing the curable composition of the invention.

Those skilled in the art will appreciate that in condensation reaction curing compositions, cure can be induced in the absence of a catalyst. However, such reactions require the application of high temperatures.

Component (E) is a first optional silicone rubber. The amount of component (E) in the curable composition is 0 to 30 weight %, preferably 5 to 20 weight %. Suitable silicone rubbers for component (E) and methods for their incorporation into a curable composition are disclosed in U.S. Pat. Nos. 5,747,608 and 5,830,950, both of which are hereby incorporated by reference. The silicone rubber has the empirical formula:

$(R^5_{(3-p)}R^1_p SiO_{1/2})(R^5_2 SiO_{2/2})_z((R^5_{(2-q)}R^1_q SiO_{2/2}) (R^5_2 SiO_{2/2})_z)_y(R^5_{(3-p)}R^1_p SiO_{1/2})$ wherein each $R^1$ is as described above, p is 1, 2 or 3, q is 1 or 2, z is an integer greater than or equal to 6, and y is zero or an integer up to 10. Each $R^5$ group in component (E) is independently selected from the nonfunctional groups for $R^2$, described above. Each $R^1$ is a functional group which participates in the curing reaction to form the cured silsesquioxane of the present invention, as discussed above.

In the empirical formula, z represents the average nonfunctional linear chain length of the silicone rubber, i.e. the average chain length between $R^1$ groups. Hence, component (E) can be a mixture of silicone rubbers of various degrees of polymerization, all of which are represented by above empirical formula. Most silicone rubbers used in connection with the present invention have reactive groups only at the terminal groups of the chain. In such instances, the term "Degree of polymerization" ("DP") as used herein is the same as the value of z. DP does not include the terminal functional siloxy groups $R^1$.

In the preferred embodiment of the invention, the $R^5$ groups are methyl groups, phenyl groups, or a combination thereof. When a high percentage of the $R^2$ groups of component (A) the silsesquioxane precursor and the $R^5$ groups of (E) the first silicone rubber are either predominantly methyl or predominantly phenyl, (A) the silsesquioxane precursor and (E) the first silicone rubber are generally compatible, permitting the rubber to be dispersed throughout the cured silsesquioxane resin structure in a relatively homogeneous manner.

Component (F) is a second optional silicone rubber. This optional silicone rubber is a polydiorganosiloxane of the empirical formula $R^5_2 R^2 SiO(R^5_2 SiO)_m(R^5 R^2 SiO)_n SiR^2 R^5_2$ wherein each $R^2$ and each $R^5$ are as described above, with the proviso that at least two $R^2$ groups per molecule must be $R^1$, m is 150 to 1,000, preferably 246 to 586, and n is 1 to 10. The amount of component (F) in the curable composition is generally 0 to 15 weight %, preferably 2 to 8 weight %.

Component (G) is an optional solvent. Typically, the amount of solvent is 0 to 90 weight %, preferably 0 to 50 weight % of the composition. Suitable solvents for this invention include alcohols such as methyl, ethyl, isopropyl, and t-butyl; aromatic hydrocarbons such as benzene, toluene, and xylene; aliphatic hydrocarbons such as heptane, hexane, and octane; glycol ethers such as propylene glycol methyl ether, dipropylene glycol, methyl ether, propylene glycol n-butyl ether, propylene glycol n-propyl ether, and ethylene glycol n-butyl ether; and halogenated hydrocarbons such as 1,1,1-trichloroethane and methylene chloride. Toluene and isopropyl alcohol are preferred.

This invention further relates to a method for synthesizing and curing the curable silsesquioxane resin composition described above. The method for synthesizing the curable silsesquioxane resin composition comprises: 1) copolymerizing a combination comprising components (A) and (B), described above, thereby synthesizing the curable silsesquioxane resin composition. The curable silsesquioxane resin composition can then to be cured by 2) heating for a time and to a temperature sufficient to cure the curable silsesquioxane resin composition, thereby forming a cured silsesquioxane resin.

The combination comprising components (A) and (B) may further comprise component (G) a solvent used to dissolve the components in the combination. Furthermore, component (A) in the combination may further comprise (C) a crosslinker, as described above. The combination may further comprise (D') a weak condensation reaction catalyst. Weak condensation reaction catalysts for component (D') include alkoxides of Group IVA metals such as zirconium and hafnium. Component (D') is exemplified by titaniumtetrabutoxide, as described above.

Copolymerizing is carried out by heating the combination comprising components (A) and (B) until substantially all of component (B) has reacted with component (A). This may be confirmed by using $^{29}Si$ nuclear magnetic resonance spectroscopy and other spectroscopic techniques.

After copolymerization, other optional components may be added to the resulting curable silsesquioxane resin composition comprising the copolymerized reaction product of components (A) and (B). The other optional components include (D") a strong condensation reaction catalyst such as choline octoate and zinc octoate, (E) a first silicone rubber, (F) a second silicone rubber, and (G) an additional or another solvent, described above. The curable silsesquioxane resin composition is then heated to a temperature for a time sufficient to cure the composition and thereby form a cured silsesquioxane resin.

The cured silsesquioxane resin can be prepared as a thin film on a substrate. To form a thin film, a solution of the curable silsesquioxane resin composition synthesized in step 1), above, in an appropriate solvent is made. Component (D") a strong condensation reaction catalyst is added to the solution. A substrate is then coated with the resin solution, and the coated substrate is dried to remove the solvent and heated to cure the curable composition. Drying can be carried out by any convenient means such as exposure to ambient air or mild heat.

The cured silsesquioxane resin can also be prepared as a cured silicone resin product such as a thick monolith. To make the cured silsesquioxane resin product, a long, slow curing cycle is used. A solution of the curable silsesquioxane resin composition synthesized in step 1), above, in an appropriate solvent is made. Component (D") a strong condensation catalyst is added to the solution. Thereafter, the resulting catalyzed resin solution is cast in a mold and the majority of the solvent is removed. The solvent can be removed by any convenient means, such as exposure to ambient air or mild heat. The resulting uncured casting is then heated slowly to cure. A typical heating profile is 65° C. to 110° C. at 5° C. increments with 24 hours per increment, 120° C. for 24 hours, 130° C. for 24 hours, 150° C. for 6 hours, 175° C. for 6 hours, 200° C. for 12 hours, 230° C. for 3 hours, and 260° C. for 8 hours. The resulting cured silsesquioxane resin is in the form of a plaque or thick monolith, which is then cooled slowly to room temperature. Alternatively, the solvent may be removed from the catalyzed resin solution, and thereafter the resulting uncured catalyzed resin may be injection molded before heating to cure.

The cured silsesquioxane resin of this invention has superior mechanical properties. For example: ultimate strain is up to 7.27%, Young's modulus is up to 1.74 GPa, flexural strength is up to 54.97 MPa, $K_{Ic}$ is up to 0.54 MPam$^{1/2}$, and $G_{Ic}$ is up to 246 J/m$^2$.

EXAMPLES

These examples are intended to illustrate the invention to those skilled in the art and should not be interpreted as limiting the scope of the invention set forth in the claims.

Reference Example 1
Preparation of p-bis(hydroxydimethylsilyl) benzene

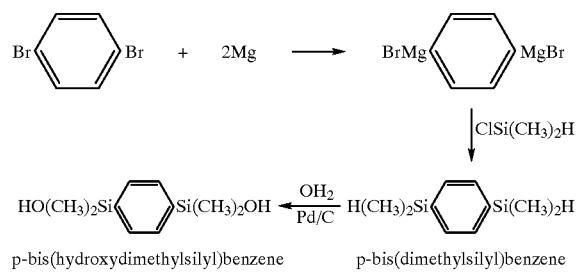

p-bis(hydroxydimethylsilyl)benzene     p-bis(dimethylsilyl)benzene

A 5 L three necked, round bottomed flask was charged with 84 g of magnesium (Mg) and 406 g tetrahydrofuran (THF). The flask was equipped with a stirrer, a condenser, two addition funnels, a thermometer, and heated with a heating mantle and purged with dry nitrogen. 10 g of BrCH$_2$CH$_2$Br was added to activate the Mg. The solution of 270 g of dibromobenzene in 526 g THF was added to one of the addition funnels, and 400 g of THF was added to the other addition funnel.

The flask was heated to 50 to 60° C., then 200 mL of THF was added and the dibromobenzene solution was added over about one and one-half hours. The addition rate of dibromobenzene was adjusted so that a good amount of reflux was maintained.

After that 500 ml THF was added and the flask was heated at 65° C. for 5 hours, then the heater was turned off and the flask was cooled overnight under nitrogen while being stirred. When it was cooled down to room temperature, 500 mL more THF was added and 440 g of dimethyl chlorosilane was added slowly while the flask was cooled by a ice water bath. A dry ice condenser was mounted on top of the condenser to help minimize the loss of dimethyl chlorosilane. The addition of dimethyl chlorosilane was adjusted so that a good reflux was maintained. After the addition of dimethyl chlorosilane the flask was heated at 60° C. overnight.

The flask was cooled to room temperature and 1000 ml of toluene was added. Saturated NH$_4$Cl aqueous solution was added slowly to hydrolyze and condense the excess dimethyl chlorosilane and the mixture was then washed with a large amount of water until a more or less clear bottom phase was obtained.

The top organic phase was collected and dried with magnesium sulfate and most of the solvent was removed by distillation until a temperature of 150° C. in the flask was reached. The concentrated crude product was further purified by distillation under vacuum.

The distillation yielded 140 g of >96% pure p-bis (dimethylsilyl) benzene. Also obtained were 28 g of 80% pure, 25 g 41.5% pure and 15 g of 16% product in a mixed solvent of THF and toluene. The total yield was 55% of p-bis(dimethylsilyl) benzene.

Hydrolysis of p-bis(dimethylsilyl) benzene to p-bis (hydroxydimethylsilyl) benzene was carried out in dioxane with Palladium on activated carbon as the catalyst. 0.1565 g of NaH$_2$PO$_4$.H$_2$O and 0.9648 g of Na$_2$HPO$_4$ were dissolved in 40 g of de-ionized water to make a buffer solution. 2.5 g of this buffer solution was placed in a three necked flask with 100 g of dioxane and 0.25 g 5% Palladium/Carbon. 13.5 g of 80% p-bis(dimethylsilyl)benzene was slowly added while stirring. An outlet was connected to one neck of the flask and the release of H$_2$ was observed by bubbling it through a water beaker. The solution was stirred for another three hours after the addition of reactants and filtered. It was then dried in a rotary evaporator and re-dissolved in a mixed solvent of 90 g toluene with 14 g of THF. The solution was put into a freezer at –10° C. and 4.6 g of dried product was crystallized out. $^{29}$Si NMR showed that the product was nearly pure with undetectable condensed species.

Reference Example 2
Preparation of a Silsesquioxane Precursor

A silsesquioxane precursor was prepared by hydrolysis and condensation of the following reactants: 45 mole % CH$_3$SiCl$_3$, 5 mole % (C$_6$H$_5$)(CH$_2$)SiCl$_2$, 10 mole % (C$_6$H$_5$)$_2$SiCl$_2$, and 40 mole % C$_6$H$_5$SiCl$_3$. Specifically, the procedure is described below.

40.64 g (0.677 mole) isopropanol was slowly added to 80 g (0.525 mole) methyl trichlorosilane at room temperature while stirring. 100 g (0.466 mole) phenyl trichlorosilane, 29.8 g (0.117 mole) diphenyl dichlorosilane, 11.3 g (0.059 mole) phenylmethyl dichlorosilane, and 6.4 g toluene was then mixed in. 183 g of toluene and 778.6 g (43.256 mole) water were placed in a 2 L three necked flask and the chlorosilane mixture was added slowly at room temperature while vigorously stirred. After the addition of chlorosilanes the hydrolyzate was stirred for an hour and phase separated.

The top organic phase was washed four times by 600 to 800 ml of deionized water and phase separated. It was then condensed to ~65 weight %.

The resulting diphenyl, methyl, phenyl, phenylmethyl silicone had the empirical formula:

$$((C_6H_5)_2SiO_{2/2})_{0.10}(C_6H_5SiO_{3/2})_{0.40}(CH_3SiO_{3/2})_{0.45}((C_6H_5)(CH_2)SiO_{2/2})_{0.05}$$

Reference Example 3
Preparation of a Modified Silsesquioxane Precursor

A silsesquioxane precursor was prepared by hydrolysis and condensation of the following reactants: 5 mole % $HOMe_2SiC_6H_4SiMe_2OH$, 45 mole % $CH_3SiCl_3$, 5 mole % $(C_6H_5)(CH_2)SiCl_2$, 10 mole % $(C_6H_5)_2SiCl_2$, and 40 mole % $C_6H_5SiCl_3$. Specifically, the procedure is described below.

40.64 g (0.677 mole) isopropanol was slowly added to 80 g (0.525 mole) methyl trichlorosilane at room temperature while stirring. 100 g (0.466 mole) phenyl trichlorosilane, 29.8 g (0.117 mole) diphehyl dichlorosilane, 11.3 g (0.059 mole) phenylmethyl dichlorosilane, and 6.4 g toluene was then mixed in. 13.2 g 1,4-bis(hydroxydimethylsilyl) benzene was dissolved in 80 g of THF and then mixed with the chlorosilanes. 183 g of toluene and 778.6 g (43.256 mole) water were placed in a 2 L three necked flask and the chlorosilane mixture was added slowly at room temperature while vigorously stirred. After the addition of chlorosilanes the hydrolyzate was stirred for an hour and phase separated. The top organic phase was washed four times by 600 to 800 ml of deionized water and phase separated. It was then condensed to ~65 weight %.

Reference Example 4
Preparation of Cured Silsesquioxane Resins

The silsesquioxane precursor of Reference Example 2, or a silsesquioxane precursor formed by copolymerizing a silyl-terminated hydrocarbon of Reference Example 1 with the compositions of Reference Example 2, was cured according to the following procedure.

The silsesquioxane precursors were dissolved in toluene and catalyzed with 0.05% of a condensation reaction catalyst. The resulting combination was cast in a mold. The catalyst had the following composition: 7.2% zinc octoate, 47% n-Butanol, 30% toluene, 12% aliphatic petroleum distillates, 0.6% zinc hydroxide, and 3% choline 2-ethylhexanoate.

The majority of the solvent was removed in a vacuum oven at 90° C. The resin casting was then heated from 65° C., to 110° C., at 5° C. and 24 hours per increment, and then at 120° C. for 24 hours, 130° C. for 24 hours, 150° C. for 6 hours, 175° C. for 6 hours, 200° C. for 12 hours, 230° C. for 3 hours, and 260° C. for 8 hours. The resulting cured silsesquioxane resin was then cooled slowly to room temperature.

Reference Example 5
Three Point Flexural Testing

The three point bending test was performed on an Instron 8562 per ASTM standard D 790. The cured resin specimens prepared in the Examples described below were polished until smooth, and visible scratch free surfaces were obtained. All samples were polished through the same procedure to ensure a similar surface condition. The polished samples were dried at 80° C. overnight and conditioned at the testing temperature and humidity for at least 24 hours before testing. The test temperature was 21° C. For each sample at least three specimens were tested.

During testing, force-displacement curves were recorded. The toughness of the cured resin was obtained as the area under the stress-strain curves. The flexural strength was calculated using the peak force as:

$$S=3PL/2bd^2$$

where S is the stress in the outer surface at the mid span, P the maximum load, L the support span, and b and d are the width and thickness of the beam. The maximum strain was calculated, using the maximum displacement, as:

$$\epsilon=6Dd/L^2$$

where $\epsilon$ is the strain at break and D is the maximum displacement. The slope of the steepest initial straight-line portion of the load-displacement curve was taken as the Young's modulus.

Reference Example 6
Fracture Toughness Testing

The plane strain fracture toughness, $K_{Ic}$, was obtained per ASTM D 5045, and the critical strain energy release rate, $G_{Ic}$, was calculated from $K_{Ic}$ based on Linear Elastic Fracture Mechanics (LEFM) assumptions. Six specimens of each sample were obtained. A notch was cut at the center of the specimen, and a natural crack extending from the root of the notch to about half of the width was produced by gently tapping a sharp razor blade into the notch. Samples were conditioned at room temperature for at least twenty four hours before testing to allow fall relaxation of deformation. The FIGURE represents a specimen used for fracture toughness testing. In The FIGURE, P represents the highest load, a represents pre-crack width, W represents a specimen width of 9.525 mm, L1 is 38 mm, and L2 is 51 mm. The displacement rate of the test was 10 mm/minute. For the geometry and loading conditions shown in The FIGURE, with a support to width ratio of 4, $$K_{Ic}=(P/(BW^{1/2}))f(x)$$

where P is the highest load and:

$$f(x)=6x^{1/2}(1.99-x(1-x)(2.15-3.93x+2.7x^2))/((1+2x)(1-x)^{3/2})$$

where x is the pre-crack to specimen width ratio, a/W. After the test the pre-crack length was measured. Only those specimens with a value between 0.45 to 0.55 were considered valid. The variation of x across the thickness should be less than 10%. The validity of the test was further ensured by comparing the sample dimensions with the estimated plastic zone size enlarged by approximately 50:

$$B,a,(W-a)>2.5(K_{Ic}/\sigma_y)^2$$

where $\sigma_y$ is the yield stress of the sample.
From the $K_{Ic}$, $G_{Ic}$ was calculated by:

$$G_{Ic}=K^2_{Ic}(1-v^2)/E$$

where υ, the Poisson's ratio of the resin, was neglected to simplify the experiment. For a glassy polymer with a Poisson's ratio of 0.3, $G_{Ic}$ was exaggerated by about 9%. However, the relative ranking of $G_{Ic}$ values would not be obscured since the change of the square of the Poisson's ratio is usually small from one resin to another of similar stiffness.

Example 1

A cured silsesquioxane resin was prepared by the method of Reference Example 4. The silyl-terminated hydrocarbon was 2.5 mole % p-bis(hydroxydimethylsilyl) benzene.

The cured silsesquioxane resin was evaluated by the test methods in Reference Examples 5–6. Young's Modulus, Strain at Break, Flexural Strength, $K_{Ic}$ and $G_{Ic}$ values are presented in Table 1.

Example 2

A cured silsesquioxane resin was prepared by the method of Reference Example 4. The silyl-terminated hydrocarbon was 2.5 mole % of 1,4-bis(2-(chlorodimethylsilyl)ethyl)benzene.

The cured silsesquioxane resin was evaluated by the test methods in Reference Examples 5–6. Young's Modulus, Strain at Break, Flexural Strength, $K_{Ic}$ and $G_{Ic}$ values are presented in Table 1.

Comparative Example 1

The silsesquioxane precursor of Reference Example 2 was cured and evaluated by the test methods in Reference Examples 5–6. Young's Modulus, Strain at Break, Flexural Strength, $K_{Ic}$ and $G_{Ic}$ values are presented in Table 1.

Example 3

A cured silsesquioxane resin was prepared by the method of Reference Example 4. The silyl-terminated hydrocarbon was 5.0 mole % of 1,4-bis(2-(chlorodimethylsilyl)ethyl)benzene.

The cured silsesquioxane resin was evaluated by the test methods in Reference Examples 5–6. Young's Modulus, Strain at Break, Flexural Strength, $K_{Ic}$ and $G_{Ic}$ values are presented in Table 1.

Comparative Example 2

A cured silsesquioxane resin was prepared by the method of Reference Example 4, except that 10 weight % of an end-functionalized short polydimethylsiloxane of the structure: $(CH_3CH_2O)_3SiO((CH_3)_2SiO)_{55}Si(OCH_2CH_3)_3$, was added and the resulting product was cured to yield a cured silsesquioxane resin.

The cured silsesquioxane resin was evaluated by the test methods in Reference Examples 5–6. Young's Modulus, Strain at Break, Flexural Strength, $K_{Ic}$ and $G_{Ic}$ values are presented in Table 1.

Example 4

A cured silsesquioxane resin was prepared by the method of Reference Example 4. The silyl-terminated hydrocarbon was 2.5 mole % of 1,4-bis(2-(chlorodimethylsilyl)ethyl)benzene, and 10 weight % of end-functionalized short polydimethylsiloxane were added.

The cured silsesquioxane resin was evaluated by the test methods in Reference Examples 5–6. Young's Modulus, Strain at Break, Flexural Strength, $K_{Ic}$ and $G_{Ic}$ values are presented in Table 1.

Example 5

A resin precursor was made by the following procedure: 23.1 g bis(hydroxydimethylsilyl) benzene was dissolved in 70 g THF and mixed with 248 g methyl trichlorosilane, 350 g phenyl trichlorosilane, 104.3 g diphenyl dichlorosilane, and 39.6 g phenyl methyl dichlorosilane. This mixture was then added dropwise into 2725 g water and 687 g toluene while the latter was being stirred vigorously. One hour was taken to add it. After addition the mixture was stirred for another hour and then phase separated. The top organic phase was washed four times by 1000 ml deionized water, and then condensed at 95 to 115° C. to a concentration of 65 wt. %.

The resin precursor was cured by the method of Reference Example 4. The cured silsesquioxane resin was evaluated by the test methods in Reference Examples 5–6. Young's Modulus, Strain at Break, and Flexural Strength values are presented in Table 1.

TABLE 1

Test Results for Addition Cured Silsesquioxane Resins

| Properties | Young's Modulus (GPa) | Strain at Break (%) | Flexural Strength (MPa) | $K_{Ic}$ (MPam$^{1/2}$) | $G_{Ic}$ (J/m$^2$) |
|---|---|---|---|---|---|
| Example 1 | 1.74 | 4.96 | 54.97 | nd | nd |
| Example 2 | 1.66 | 5.05 | 51.82 | 0.267 | 43.69 |
| Comparative Example 1 | 1.88 | 2.46 | 37.73 | 0.253 | 34.05 |
| Example 3 | 1.46 | 6.25 | 50.33 | 0.468 | 149.49 |
| Comparative Example 2 | 1.37 | 7.43 | 48.49 | 0.453 | 149.79 |
| Example 4 | 1.25 | 7.27 | 46.39 | 0.541 | 236.04 |
| Example 5 | 1.74 | 4.96 | 54.97 | nd | nd |

Note: 'nd' means not determined.

We claim:

1. A method for synthesizing a curable silsesquioxane resin composition, wherein the method comprises: 1) copolymerizing a combination comprising components (A) and (B) wherein component (A) is a hydrolyzate of a hydrolysis precursor wherein the hydrolysis precursor comprises (i) organotrialkoxysilanes or organotrihalosilanes and (ii) a monofunctional silane selected from the group consisting of triorganomonoalkoxysilanes, triorganomonohalosilanes, disiloxanes, and disilazanes and component (B) is a silyl-terminated hydrocarbon having the formula:

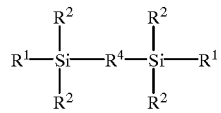

wherein each $R^1$ is independently selected from the group consisting of a halogen atom, a hydroxyl group, an alkoxy group, an oximo group, an alkyloximo group, an aryloximo group, an alkylcarboxyl group, and an arylcarboxyl group, each $R^2$ is independently selected from the group consisting of alkyl and aryl groups, and $R^4$ is a divalent hydrocarbon group.

2. A method according to claim 1, wherein the hydrolysis precursor further comprises (iii) a difunctional silane selected from the group consisting of diorganodihalosilanes and diorganodialkoxysilanes.

3. A method according to claim 2, wherein (A) further comprises (C) a crosslinker selected from the group consisting of tetraethoxysilane, methyltriacetoxysilane, methyltrioximosilane, and tetraoximosilane.

4. A method according to claim 2, wherein the combination further comprises (D') a weak condensation reaction catalyst selected from the group consisting of metal esters of Group IVB metals and alkoxides of Group IVB metals.

5. A method according to claim 2, wherein the combination further comprises (G) a solvent.

6. A method according to claim 2, wherein the method further comprises 2) heating the curable silsesquioxane resin composition for a time and to a temperature sufficient to cure the curable composition, thereby forming a cured silsesquioxane resin.

7. A method according to claim 6, wherein the method further comprises adding (D") a strong condensation reaction catalyst to the curable silsesquioxane resin composition prior to step (2).

8. A method according to claim 7, wherein (D") is selected from the group consisting of zinc octoate, choline octoate, sulfuric acid, phosphoric acid, potassium hydroxide, cesium hydroxide, metal silanolates, and calcined lime.

9. A method according to claim 6, wherein the method further comprises adding one or more components selected from the group consisting of:

(E) a first silicone rubber having the empirical formula

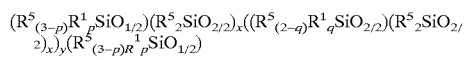

wherein each $R^1$ is as described above, each and $R^5$ is independently selected from the nonfunctional $R^2$ groups, p is 1, 2 or 3, q is 1 or 2, x is an integer greater than or equal to 6, and y is zero or an integer up to 10, (F) a second silicone rubber, having the empirical formula

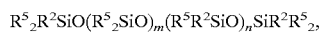

where $R^2$ is $R^1$ or $R^2$ as described above and each $R^5$ is as described above, with the proviso that at least two $R^2$ groups per molecule must be $R^1$, m is 150 to 1,000, and n is 0 to 10, and (G) a solvent wherein one or more of components (E), (F), and (G) is added to the curable silsesquioxane resin composition after step 1) and prior to step 2).

10. A method according to claim 1, wherein (i) is an organotrihalosilane selected from the group consisting of methyltrichlorosilane, phenyltrichlorosilane, or a combination thereof.

11. A method according to claim 1, wherein (B) is selected from the group consisting of p-bis(hydroxydimethylsilyl)benzene and p-bis(chlorodimethylsilyl-ethyl)benzene.

12. A method according to claim 1, further comprising 2) heating the curable silsesquioxane resin composition for a time and to a temperature sufficient to cure the curable composition, thereby forming a cured silsesquioxane resin.

13. A method according to claim 12, wherein the method further comprises adding (D") a strong condensation reaction catalyst to the curable silsesquioxane resin composition prior to step (2).

14. A method according to, claim 13, wherein (D") is selected from the group consisting of zinc octoate, choline octoate, sulfuric acid, phosphoric acid, potassium hydroxide, cesium hydroxide, metal silanolates, and calcined lime.

15. A method according to claim 12, wherein the method further comprises adding one or more components selected from the group consisting of:

(E) a first silicone rubber having the empirical formula

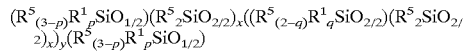

wherein each $R^1$ is as described above, each and $R^5$ is independently selected from the nonfunctional $R^2$ groups, p is 1, 2 or 3, q is 1 or 2, x is an integer greater than or equal to 6, and y is zero or an integer up to 10, (F) a second silicone rubber, having the empirical formula $R^5{}_2R^2SiO(R^5{}_2SiO)_m(R^5R^2SiO)_nSiR^2R^5{}_2,$ where $R^2$ is $R^1$ or $R^2$ as described above and each $R^5$ is as described above, with the proviso that at least two $R^2$ groups per molecule must be $R^1$, m is 150 to 1,000, and n is 0 to 10, and (G) a solvent wherein one or more of components (E), (F), and (G) is added to the curable silsesquioxane resin composition after step 1) and prior to step 2).

16. A method according to claim 1, wherein (A) further comprises (C) a crosslinker selected from the group consisting of tetraethoxysilane, methyltriacetoxysilane, methyltrioximosilane, and tetraoximosilane.

17. A method according to claim 1, wherein the combination further comprises (D') a weak condensation reaction catalyst selected from the group consisting of metal esters of Group IVB metals and alkoxides of Group IVB metals.

18. A method according to claim 1, wherein the combination further comprises (G) a solvent.

19. A method for preparing a cured silicone resin product, wherein the method comprises:

1) copolymerizing a combination comprising components (A) and (B) wherein component (A) is a hydrolyzate of a hydrolysis precursor wherein the hydrolysis precursor is selected from the group consisting of organotrialkoxysilanes and organotrihalosilanes and component (B) is a silyl-terminated hydrocarbon having the formula:

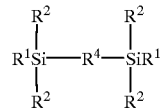

wherein each $R^1$ is independently selected from the group consisting of a halogen atom, a hydroxyl group, an alkoxy group, an oximo group, an alkyloximo group, an aryloximo group, an alkylcarboxyl group, and an arylcarboxyl group, each $R^2$ is independently selected from the group consisting of alkyl and aryl groups, and $R^4$ is a divalent hydrocarbon group;

2) adding (G) a solvent and (D") a strong condensation catalyst to the product of step 1);

3) mold casting the product of step 2);

4) removing the solvent from the product of step 3); and 5) heating the product of step 4) for a time and to a temperature sufficient to cure.

* * * * *